United States Patent
Liang et al.

(10) Patent No.: US 7,641,829 B2
(45) Date of Patent: Jan. 5, 2010

(54) METHOD FOR MECHANICALLY CHOPPING CARBON NANOTUBE AND NANOSCALE FIBROUS MATERIALS

(75) Inventors: Zhiyong Liang, Tallahassee, FL (US); Zhi Wang, Haidian (CN); Ben Wang, Tallahassee, FL (US); Chun Zhang, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 654 days.

(21) Appl. No.: 11/185,317

(22) Filed: Jul. 20, 2005

(65) Prior Publication Data

US 2006/0017191 A1 Jan. 26, 2006

Related U.S. Application Data

(60) Provisional application No. 60/589,613, filed on Jul. 21, 2004.

(51) Int. Cl.
B28B 11/12 (2006.01)
(52) U.S. Cl. ................... 264/157; 264/140; 264/241; 264/913; 264/916; 977/842
(58) Field of Classification Search ................ 264/140, 264/643, 105, 128, 104, 119, 447.3, 447.6, 264/37.1, 37.28, 37.29, 37.3, 157, 241, 913, 264/916; 156/290, 278, 325, 296, 310; 524/492, 524/495, 442; 977/842
See application file for complete search history.

(56) References Cited

U.S. PATENT DOCUMENTS

| | | | | |
|---|---|---|---|---|
| 3,779,789 A | * | 12/1973 | Park | ........................... 427/227 |
| 4,562,033 A | * | 12/1985 | Johnson et al. | ............ 264/510 |
| 5,424,013 A | * | 6/1995 | Lieberman | ................ 264/40.1 |
| 6,036,857 A | | 3/2000 | Chen et al. | |
| 6,056,901 A | * | 5/2000 | Hamatani et al. | ........ 264/37.28 |
| 6,271,270 B1 | * | 8/2001 | Muzzy et al. | ............. 521/48 |

(Continued)

OTHER PUBLICATIONS

Adrian M. Cunliffe et al, Recycling of fiber-reinforced polymeric waste by pyrolysis: thermo-gravimetric and bench-scale investigations, 2003, Journal of Analytical and Applied Pyrolysis, vol. 70, pp. 315-338.*

(Continued)

Primary Examiner—Joseph S. Del Sole
Assistant Examiner—Timothy Kennedy
(74) Attorney, Agent, or Firm—Sutherland Asbill & Brennan LLP (57) ABSTRACT

Methods are provided for mechanically chopping nanotubes and other nanoscale fibrous materials. The method includes forming a macroscale article which include the nanoscale fibers, and then mechanically cutting the macroscale article into a finely divided form. In one embodiment, these steps are repeated. The nanoscale fibers may be carbon nanotubes, which optionally are aligned in the macroscale article. The macroscale article may be in the form of or include one or more buckypapers. In one embodiment, the macroscale article further includes a solid matrix material in which the nanoscale fibers are contained or dispersed. The forming step can include making a suspension of nanoscale fibers dispersed in a liquid medium and then solidifying the liquid medium to form the macroscale article. After the mechanical cutting step, the medium can be dissolved or melted to enable separation of the chopped nanoscale fibers from the medium.

17 Claims, 7 Drawing Sheets

U.S. PATENT DOCUMENTS

| | | | |
|---|---|---|---|
| 6,387,967 B2 * | 5/2002 | Muzzy et al. | 521/48 |
| 6,683,783 B1 | 1/2004 | Smalley et al. | |
| 6,723,299 B1 * | 4/2004 | Chen et al. | 423/447.1 |
| 7,244,407 B2 * | 7/2007 | Chen et al. | 423/445 B |
| 2001/0051272 A1 * | 12/2001 | Toyoda et al. | 428/408 |
| 2002/0094311 A1 * | 7/2002 | Smalley et al. | 422/198 |
| 2002/0098135 A1 * | 7/2002 | Smalley et al. | 422/198 |
| 2003/0146529 A1 | 8/2003 | Chen et al. | |
| 2004/0065969 A1 | 4/2004 | Chatterjee et al. | |
| 2005/0154116 A1 * | 7/2005 | Nagy et al. | 524/492 |
| 2005/0239948 A1 | 10/2005 | Haik et al. | |
| 2006/0017191 A1 | 1/2006 | Liang et al. | |
| 2006/0166003 A1 * | 7/2006 | Khabashesku et al. | 428/413 |
| 2006/0207931 A1 | 9/2006 | Liang et al. | |
| 2007/0176319 A1 * | 8/2007 | Thostenson et al. | 264/210.6 |
| 2008/0057265 A1 | 3/2008 | Liang et al. | |
| 2008/0280115 A1 | 11/2008 | Liang et al. | |

OTHER PUBLICATIONS

M. Buggy et al, Recycling of composite materials, 1995, Journal of Materials Processing Technology, vol. 55, pp. 448-456.*

Gou et al, Experimental Design and Optimization of Dispersion Process for Single-Walled Carbon Nanotube Bucky Paper, 2004, International Journal of Nanoscience, pp. 1-12.*

Gou, et al., Title: "Development of Nanotube Bucky Paper/Epoxy Nanocomposites," Proceedings of the TEXCOMP-6 International Symposium on Textile Composites, Sep. 11-13, 2002, pp. 1-5.

Wang, et al., Title: "Fabrication and Characterization of In-Plane Aligned Nanotube Composites with Magnetically Aligned Carbon Nanotube Bucky Papers," Proc. 14th Int. Conf. On Composite Materials (ICCM-14), 1 (San Diego, CA, Jul. 14-18), — (2003) pp. 1-7.

Gou, et al., Title: "Process Analysis and Optimization of SWNT Bucky Paper Reinforce Epoxy Composites," Proceedings of the 48th International Society for Advancement of Material Process Engineering (SAMPE) Symposium and Exhibition, Long Beach, CA May 12-14, 2003, pp. 1-12.

Liang, et al., "Molecular Dynamic Simulation and Experimental Investigation of Filling Chopped SWNTS with Resin Matrix Molecules to Enhance Interfacial Bonding and Loading Transfer in Nanocomposites," SAMPE 2004, Long Beach, CA, May 16-20, 2004, pp. 1-8.

Endo, et al., Title: "Buckypaper from Coaxial Nanotubes," Nature/vol. 433/3 Feb. 2005/www.nature.com/nature; pp. 476.

Dai, Title: "Carbon Nanotubes Opportunities and Challenges," Surface Science 500 (2002), pp. 218-241.

Ajayan, et al., "Aligned Carbon Nanotube Arrays Formed by Cutting a Polymer Resin-Nanotube Composite", Science, vol. 265, pp. 1212-1214 (1994).

Ajayan, et al., "Single-Walled Carbon Nanotube-Polymer Composites: Strength and Weakness," Advanced Materials 12:750-753 (2000).

Andrews, et al., "Nanotube composite carbon fibers", Applied Physics Letters, 75(9): pp. 1329-1331(1999).

Chauvet, et al., "Magnetic anisotropies of aligned carbon nanotubes", The American Physical Society, 52(10): pp. 6963-6966 (1995).

Chen, et al., "Electrochemical synthesis of polypyrrole/carbon nanotube nanoscale composites using well-aligned carbon nanotube arrays", Applied Physics A, vol. 73, pp. 129-131 (2001).

Cooper, et al., "Distribution and Alignment of Carbon Nanotubes and Nanofibrils in a Polymer Matrix," Composites Science and Technology 62:1105-1112 (2002).

de Heer, et al., "Aligned Carbon Nanotube Films: Production and Optical and Electronic Properties," Science 268:845-847 (1995).

Dresselhaus, et al., "Graphite Fiber and Filament," M. Cardon, Ed., pp. 12-34 (1988).

Fan, et al., "Self-Oriented Regular Arrays of Carbon Nanotubes and Their Field Emission Properties," Science 283:512-514 (1999).

Fujiwara, et al., "Magnetic Orientation and Magnetic Properties of a Single Carbon Nanotube", The Journal of Physical Chemistry, 105(18): pp. 4383-4386 (2001).

Garg, et al., "Effect of chemical functionalization on the mechanical properties of carbon nanotubes", Chemical Physics Letters, 295(4): pp. 273-278 (1998). Abstract.

Gou, et al., "Experimental Design and Optimization of Dispersion Process for Single-Walled Carbon Nanotube Bucky Paper," International Journal of Nanosciencel. pp. 1-12.

Hertel, et al., "Deformation of Carbon Nanotubes by Surface van der Weals Forces," Physical Review B. 58:13870-13873 (1998).

Holloway, et al., "Texture Development Due to Preferential Grain Growth of Ho-Ba-Cu-O in 1.6-T Magnetic Field," J. Mat. Res. 8:727-733 (1993).

Knez, et al., "Electrochemical modification of individual nano-objects", Journal of Electroanalytical Chemistry, vol. 522: pp. 70-74 (2002).

Kumar, et al., "Fibers from Polypropylene/Nano Carbon Fiber Composites," Polymer 43:1701-1703 (2002).

Kyotani, et al., "Preparation of Ultrafine Carbon Tubes in Nanochannels of an Anodic Aluminum Oxide Film," Chem. Mater. 8:2109-2113(1996).

Li, et al., "Large-Scale Synthesis of Aligned Carbon Nanotubes," Science 274:1701-1703 (1996).

Lourie, et al., "Evaluation of Young's modulus of carbon nanotubes by micro-Raman spectroscopy", Journal of Materials Research, 13(9): pp. 2418-2422 (1998).

Ni, et al., "Chemical Functionalization of Carbon Nanotubes through Energetic Radical Collisions," Physical Review B. 61:R16343-R16346 (2000).

Qian, et al., "Load transfer and deformation mechanisms in carbon nanotube-polystyrene composites", Applied Physics Letters, 76(20): pp. 2868-2870 (2000).

Smith, et al., "Structural anisotropy of magnetically aligned single wall carbon nanotube films", Applied Physics Letters, 77(5): pp. 663-665 (2000).

Stephan, et al., "Characterization of singlewalled carbon nanotubes-PMMA composites", Synthetic Metals, 108(2): pp. 139-149 (2000). Abstract.

Thostenson, et al., "Nanocomposites in context," Composites Science and Technology 65: 491-516 (2005).

Treacy, et al., Exceptionally High Young's Modulus Observed for Individual Carbon Nanotubes,* Nature 381:678-680 (1996).

Velasco-Santos, et al., "Chemical Functionalization of Carbon Nanotubes through an Organosilane," Nanotechnology 13:495-498 (2000).

Velasco-Santos, et al., "Chemical functionalization of carbon nanotubes through an organosilane", Nanotechnology, vol. 13, pp. 495-498 (2002). Abstract.

Wang, et al., "Growth and characterization of buckybundles", Applied Physics Letters, 62(16): pp. 1881-1883 (1993).

Wood, et al., "Orientation of Carbon Nanotubes in Polymers and its Detection by Raman Spectroscopy," Composites: Part A 32:391-399 (2001).

Cho, et al., "Carbon nanotube synthesis using a magnetic field via thermal chemical vapor deposition," Journal of Crystal Growth 243, 2002, pp. 224-229.

Haggenmueller, et al., "Aligned single-wall carbon nanotubes in composites by melt processing methods," Chemical Physics Letters 330, Nov. 10, 2000, pp. 219-225.

Kimura, et al., "Polymer Composites of Carbon Nanotubes Aligned by a Magnetic Field," Advanced Materials, v14 No. 19, Oct. 2, 2002, pp. 1380-1383.

Thostenson, et al., "Advances in the science and technology of carbon nanotubes and their composites: a review," Composites Science and Technology 61, 2001, pp. 1899-1912.

Wu, et al., "Deposition of Nanotube Composites using Matrix-Assisted Pulsed Laser Evaporation," Materials Research Society Symposium, Vol. 617, 2000, pp. J2.3.1-6.

* cited by examiner

METHOD FOR MECHANICALLY CHOPPING CARBON NANOTUBE AND NANOSCALE FIBROUS MATERIALS

CROSS-REFERENCE TO RELATED APPLICATIONS

This application claims the benefit of U.S. Provisional Application No. 60/589,613, filed Jul. 21, 2004. The application is incorporated herein by reference in its entirety.

BACKGROUND OF THE INVENTION

This invention relates generally to carbon nanotubes and nanofibers, and more particularly to methods for manipulating the length and functionality of carbon nanotube and nanofiber materials, preferably without sidewall damage.

Take single-walled carbon nanotubes (SWNTs) as an example. SWNTs are reported to have a high elastic modulus in the range of 500-600 GPa, with a tensile elastic strength of about 200 GPa. SWNTs are considered among the most promising reinforcement materials for the next generation of high-performance structural and multifunctional composites, as well as nanotube-based device applications. However, developing these SWNT-based materials and devices poses major challenges. Their large surface area, high van der Waals attraction, and large aspect ratios cause SWNTs to bond together and form long bundles and ropes. This specific phenomenon is called nanoscale self-assembly, which creates problems in nanotube dispersion and tube-to-tube sliding under tension. The interfacial bonding between the SWNTs and the matrix is usually poor due to the nanotubes' structure perfection and high chemical stability. This also causes load transfer problems, such that SWNTs will pull out from the matrix in nanocomposites instead of fracturing.

In addition, the SWNT hollow structure cannot be effectively used since conventional nanotubes are very long (relative to their diameter) and capped with fullerene structures. Nanotubes should prove to be good molecule containers for various novel applications, such as storage of hydrogen and drugs, as well as enhancing interfacial bonding with other materials at open ends, if they can be properly uncapped and functionalized at open ends.

Opened nanotubes are highly desired for the development of high performance materials and devices, for both scientific research and industrial applications. Accordingly, a number of techniques have been developed to cut nanotubes. Chopping nanotubes to create open ends in the tubes is an effective technical solution to enhance tube dispersion and interfacial bonding in nanocomposites. However, directly cutting or chopping nanotube materials is extremely difficult, due in part to the small size of nanotubes (typically several nanometers in diameter and less than one micron in length).

Current methods for shortening or cutting nanotubes can be classified into two basic categories: chemical methods and physical methods. Most chemical methods use highly concentrated acid to treat the nanotubes, potentially seriously damaging or destroying the nanotubes' unique molecular structure, which consequently would lead to significant degradation or loss of mechanical and functional nanotube properties. On the other hand, conventional physical cutting methods are time-consuming and difficult to control, requiring expensive equipment, while offering severely limited processing capacity. For example, with grinding and milling (e.g., with ceramic balls) techniques, it is difficult to control the length of the nanotubes and the process is time-consuming. Sonication cutting methods may damage the nanotubes' sidewalls. As still a further example, cutting with the aid of expensive high-resolution microscopes, such a scanning electronic microscope (SEM), an atomic force microscope (AFM), or with a lithography technique, would allow better control of the nanotube length, but only a few tubes or tube ropes could be processed at a time.

Accordingly, it would be desirable to provide improved methods for cutting or chopping carbon nanotubes, so as to effectively and efficiently control the length and functionality of the carbon nanotubes and nanofiber materials while minimizing sidewall damage. It would also be desirable to fill chopped nanotubes and enhance nanotube dispersion and interfacial bonding for producing high performance nanocomposites and device applications.

SUMMARY OF THE INVENTION

Methods and devices are provided for mechanically chopping nanotubes and other nanoscale fibrous materials. In one aspect, the method comprises forming a macroscale article which comprises nanoscale fibers, and then mechanically cutting the macroscale article into a finely divided form comprising nanoscale fibers that have been chopped. In one embodiment, these steps are repeated. For example, the method of may further include forming the chopped nanoscale fibers into a second macroscale article, and mechanically cutting the second macroscale article into a second finely divided form comprising nanoscale fibers that have been twice chopped, and may further include forming the twice chopped nanoscale fibers into a third macroscale article, and then mechanically cutting the third macroscale article into a third finely divided form comprising nanoscale fibers that have been thrice chopped. In one embodiment, the nanoscale fibers are carbon nanotubes, which optionally can be aligned nanotubes (e.g., magnetically aligned). In one embodiment, the macroscale article comprises one or more buckypapers.

In one particular embodiment, the macroscale article is formed by a process which comprises making a suspension of nanoscale fibers dispersed in a liquid medium, and then filtering the suspension through a filter membrane such that the nanoscale fibers are deposited directly on the filter membrane as the liquid medium flows through the filter membrane to form a continuous network of the nanoscale fibers, wherein the continuous network is the macroscale article. For example, the suspension can include SWNTs dispersed in a solvent, which for example could be selected from water, volatile organic liquids, and combinations thereof. The suspension may further include one or more surfactants, particularly if needed to enhance or maintain the dispersion of the nanoscale fibers.

In another embodiment, the macroscale article further comprises a solid matrix material in which the nanoscale fibers are contained or dispersed. In one embodiment of the method, the forming step comprises making a suspension of nanoscale fibers dispersed in a liquid medium and then solidifying the liquid medium, thereby forming the macroscale article. After the mechanical cutting step, one can dissolve or melt the solidified (liquid) medium to enable the separation of the chopped nanoscale fibers from the medium.

In one embodiment, the mechanical cutting includes the use of a microtome.

In another aspect, a method is provided for making a nanocomposite material comprising combining the chopped nanoscale fibers made by the methods described herein with a liquid matrix material and then solidifying the liquid matrix material. In one embodiment, the chopped nanoscale fibers are formed into a porous continuous network form and then the liquid matrix material is impregnated into the pores of the porous network. For example, the liquid matrix material could include a polymer precursor or thermoplastic polymer. In various embodiments, the impregnation step is done with the aid of vacuum, direct pressure means, or both.

In yet another aspect, a nanocomposite material is provided which comprises the chopped nanoscale fibers made by the methods described herein. In one embodiment, the nanocomposite material comprises chopped carbon nanotubes made by the methods described herein.

DETAILED DESCRIPTION OF THE PREFERRED EMBODIMENTS

Methods have been developed for mechanically chopping nanotubes and nanoscale fibrous materials, for example to prepare nanoscale materials of a desired length. The methods enable the cost-effective and efficient chopping of large quantities of nanotubes for use across a range of materials applications. Advantageously, the methods essentially avoid nanotube damage and possibly eliminate complicated pre- and post-chemical treatment of the nanotubes. In addition, these methods can be used to chop other nanoscale fibrous materials, such as carbon nanofibers (e.g., diameters from 10 to 500 nm) and various other nanoscale rod materials. Results show that these methods can effectively chop nanotubes with controlled length and open ends.

As used herein, the terms "comprise," "comprising," "include," and "including" are intended to be open, non-limiting terms, unless the contrary is expressly indicated.

The Chopping Methods

In one aspect, methods are provided for mechanically chopping carbon nanotubes or other nanoscale fibers. Generally, the methods includes forming a macroscale article which comprises nanoscale fibers; and mechanically cutting the macroscale article into a finely divided form comprising nanoscale fibers that have been chopped (e.g., shortened, opened at one or both ends of the original elongated structure). See FIGS. 1, 2, and 7.

As used herein, the term "macroscale article" refers to a material form or structure having one or more dimensions large enough that the structure can be effectively handled and processed manually or using bulk process equipment (e.g., mechanical size reduction or cutting devices). Generally, the structure has at least one dimension at microscale or greater than several microns. Suitable dimensions can depend on the limitations of the cutting equipment. For instance, where a microtome machine has a step limit of about 5 to 10 nm, the article being cut should be larger (in at least one dimension) than this step size, and accordingly the macroscale article would have for practical application, a dimension larger than about 20 µm (e.g., between 20 and 50 µm).

In one embodiment, the methods involve pre-processing nanotube materials into sheets or bulk shapes (e.g., thin films or solids of tube/solvent mixture) and then employing conventional chopping methods to mechanically cut or chop these macroscale materials, yielding short tubes or nanofiber materials for various applications. Advantageously, the methods can effectively cut a large quantity of tubes at a desired length. The methods typically avoid the use of complicated chemical treatments and expensive equipment for cutting. More importantly, the methods essentially avoid sidewall damage of the tubes, which is important for mechanical and electrical applications. These methods are scalable for industrial production.

The Nanoscale Fibers

As used herein, the term "nanoscale fibers" refers to a thin, greatly elongated solid material, typically having a cross-section or diameter of less than 500 nm. In a preferred embodiment, the nanoscale fibers comprise or consist of carbon nanotubes, including both SWNTs and MWNT (multiple-walled carbon nanotubes). As used herein, the terms "carbon nanotube" and the shorthand "nanotube" refer to tubular graphite usually capped with fullerene structures at ends, a synthetic material, which typically has a wide molecular weight range depending on the diameter and length. Carbon nanotubes are commercially available from companies, such as Carbon Nanotechnologies, Inc. (Houston, Tex. USA), or can be produced using techniques known in the art. In a preferred embodiment, the nanotube is a single wall nanotube or SWNT. In the chopping process, the source SWNT can be pristine, in which the carbon fullerene tube has fullerene end caps, or the source SWNT can be non-pristine, for example, where the SWNT has already been chemically or mechanically chopped and then optionally functionalized to convert dangling carbon atoms to carbonyl or other oxygen containing functional groups.

The methods described herein also can be applied to other nanoscale fibrous materials besides nanotubes, including carbon nanofibers and various nanoscale rods and fibrous materials, which generally have a diameter less than 500 nm. For instance, carbon nanofibers (CNFs) are filamentous fibers that resemble whiskers of multiple graphite sheets or MWNTs.

Forming the Macroscale Article

The macroscale article can be formed essentially entirely of the nanoscale fibers, e.g., as a continuous network of interwoven or entangled or glued nanoscale fibers, formed of a solid matrix material in which the nanoscale fibers are embedded, or a combination thereof.

Continuous Network

Figure 1:
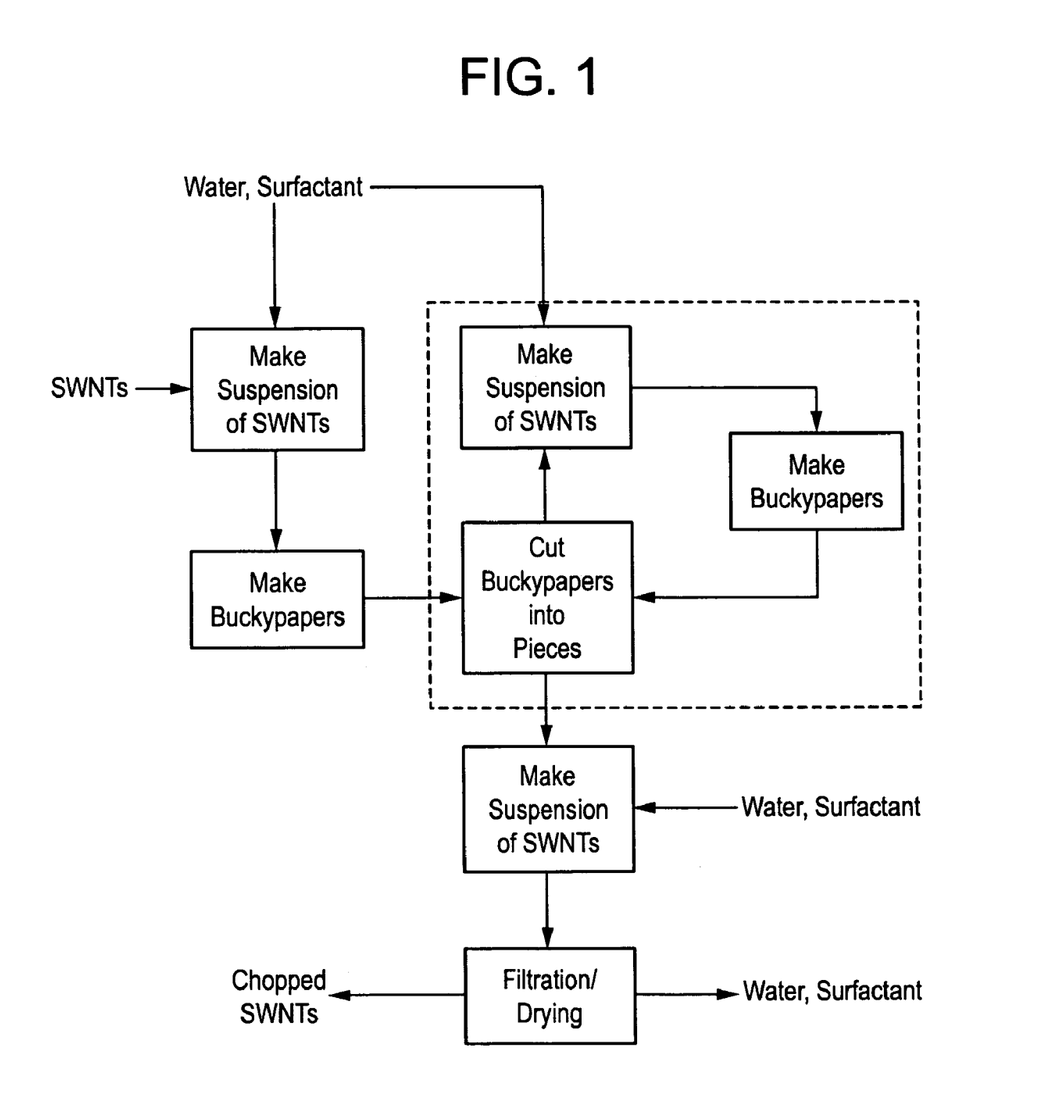
FIG. 1 is a process flow diagram illustrating one embodiment of the process for mechanically chopping carbon nanotubes.
Figure 2:
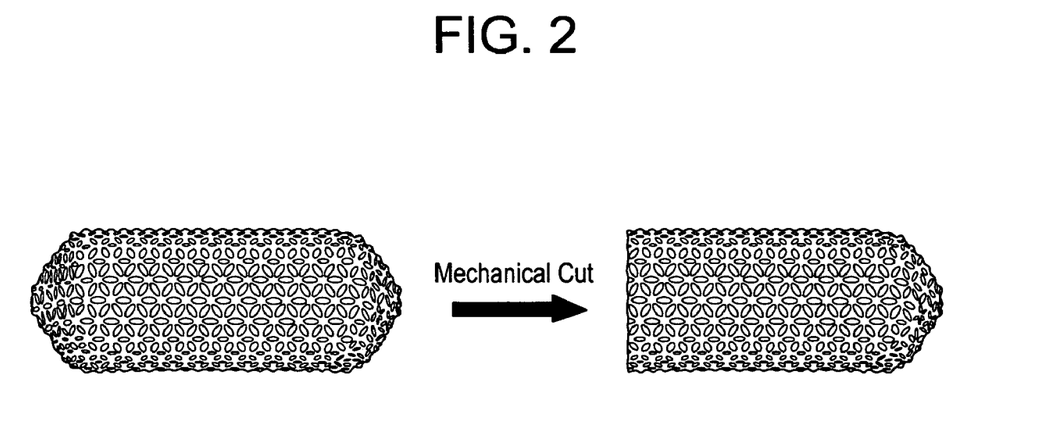
FIG. 2 is a plan view of an illustration of a pristine nanotube and a chopped nanotube, which has been mechanically cut near one end.
Figure 3:
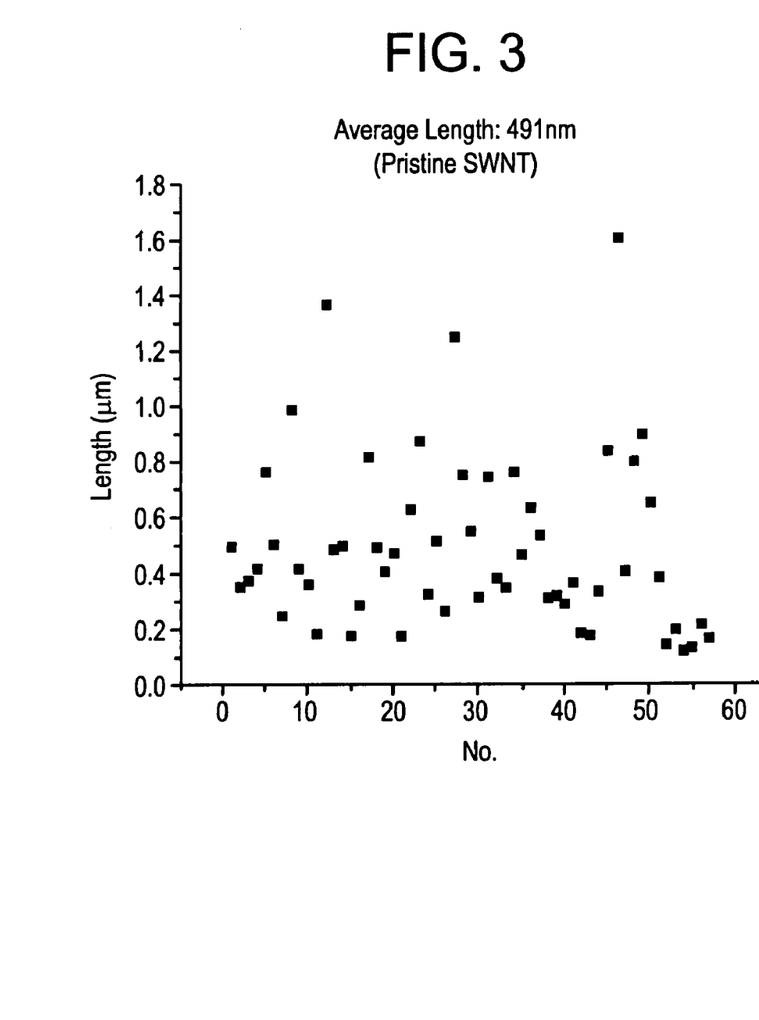
FIG. 3 is a scatter graph showing number versus length of pristine SWNTs in an experimental sample.
Figure 4:
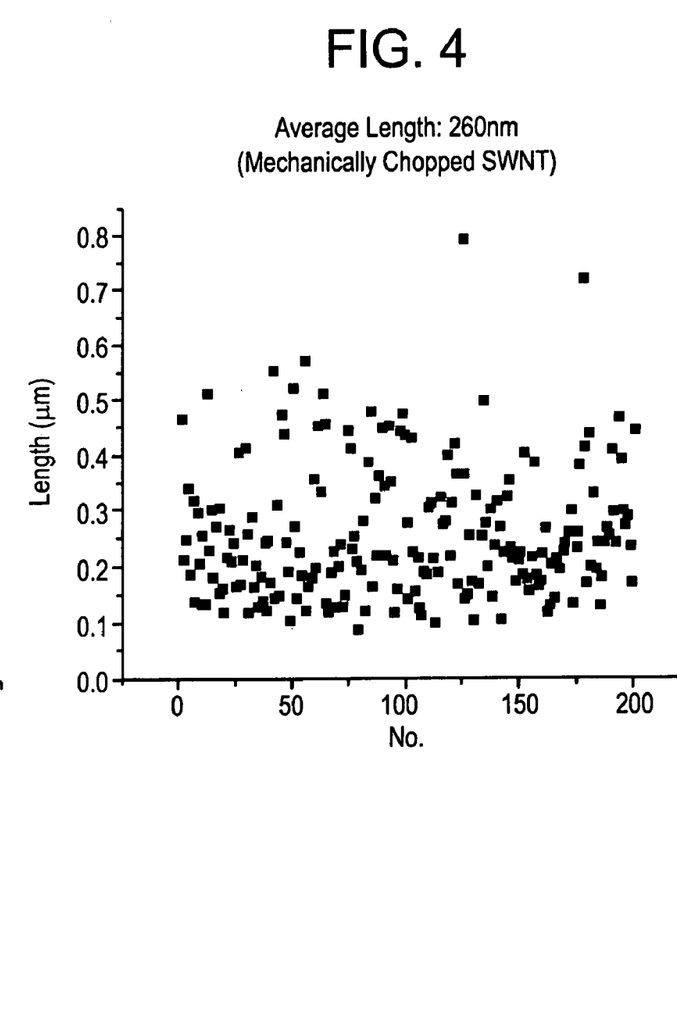
FIG. 4 is a scatter graph showing number versus length of chopped SWNTs in an experimental sample.
Figure 5:
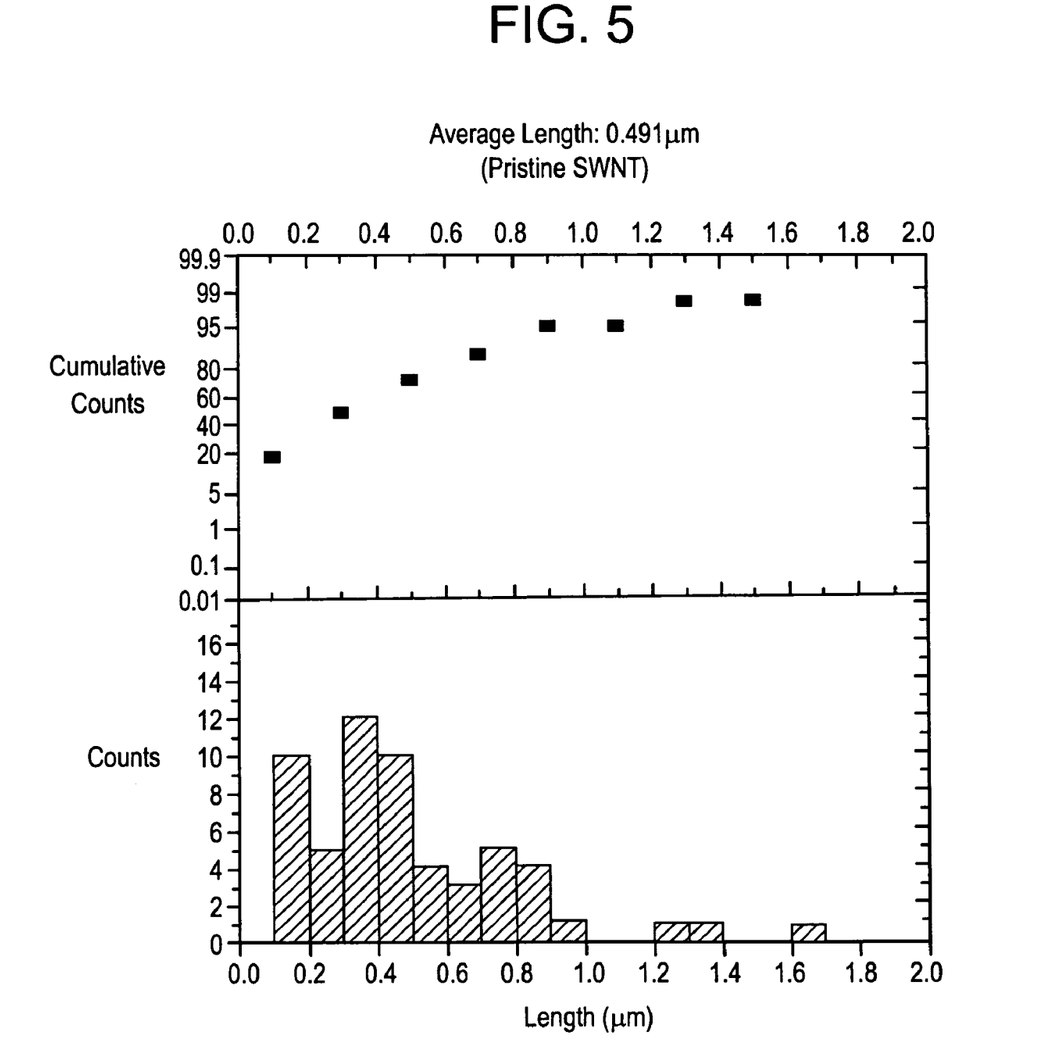
FIG. 5 is a graph showing number (counts) of pristine SWNTs in an experimental sample versus SWNT length.
Figure 6:
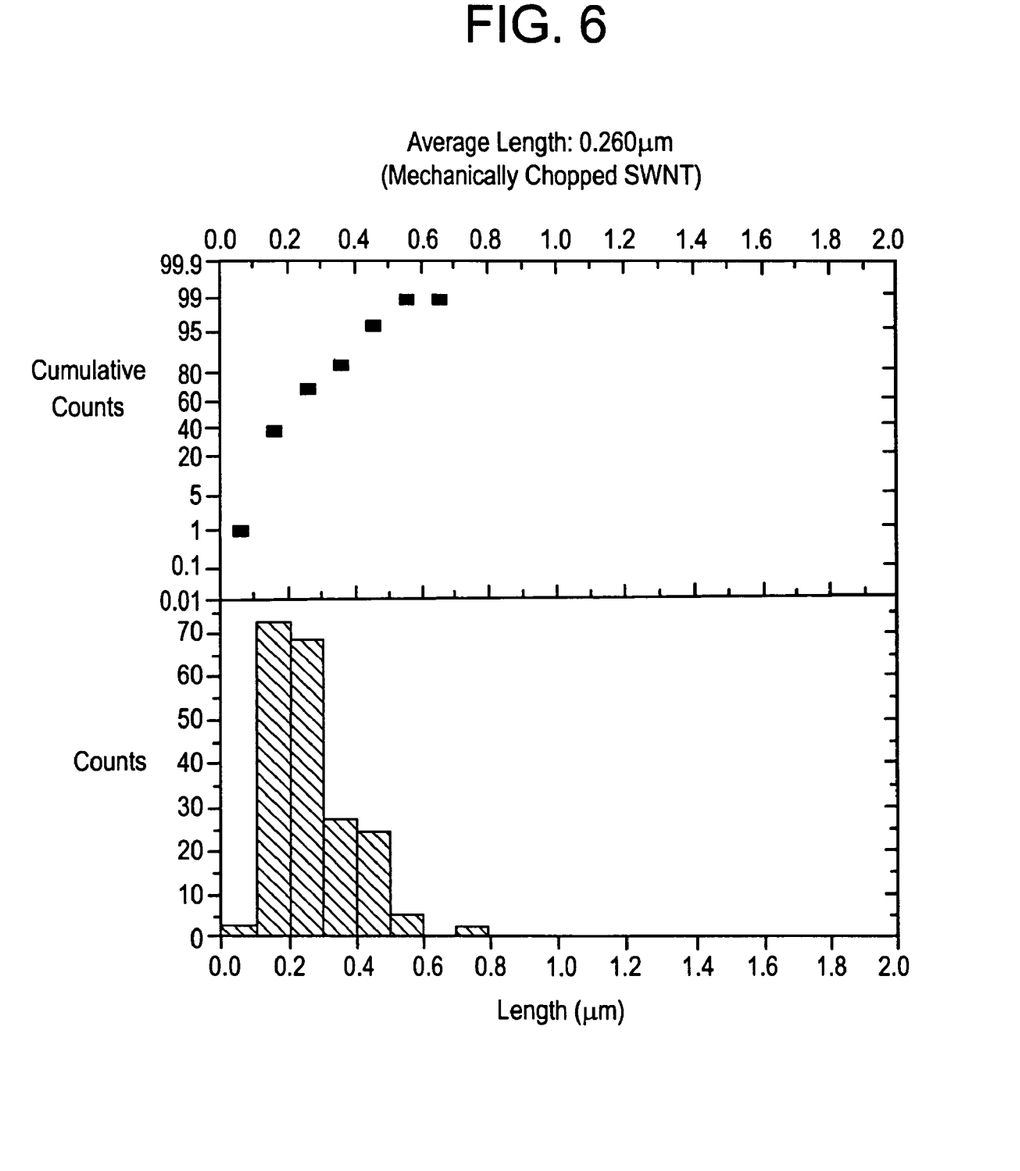
FIG. 6 is a graph showing number (counts) of chopped SWNTs in an experimental sample versus SWNT length.

In one embodiment, the macroscale article is formed by a process that includes the steps of making a suspension of nanoscale fibers dispersed in a liquid medium; and then filtering the suspension through a filter membrane such that the nanoscale fibers are deposited directly on the filter membrane as the liquid medium flows through the filter membrane to form a continuous network of the nanoscale fibers, whereby the continuous network is the macroscale article. In one particular method, which is illustrated in FIG. 1, SWNTs are first dispersed in an aqueous or organic liquid, forming a suspension with the aid of one or more surfactants, and preferably using sonication, and then the suspension is filtered to produce buckypapers. After the membrane of the nanoscale fibers is sufficiently dried, it can be separated from the filter, creating a buckypaper. Buckypapers are about 10 to about 40 μm thick with a sheet area of about 50 to about 650 $cm^2$, although larger or small buckypapers are readily envisioned. These buckypapers have macroscale dimensions, which allows them to be easily handled and directly cut in a manner similar for a conventional fiber mat.

1. Making the Suspension

The first step in making a network of nanoscale fibers involves making a suspension of the nanoscale fibers. That is, dispersing the nanoscale fibers in a non-solvent liquid processing medium. Essentially any non-solvent liquid medium can be used to process the nanoscale fibers into a continuous network. As used herein, the term "nonsolvent" refers to liquid media that essentially are non-reactive with the nanoscale fibers and in which the nanoscale fibers are virtually insoluble. Examples of suitable nonsolvent liquid media include water, volatile organic liquids, such as acetone, ethanol, methanol, n-hexane, ether, acetonitrile, chloroform, DMF and mixtures thereof. Low-boiling point solvents are typically preferred so that the solvent can be easily and quickly removed, facilitating drying of the continuous nanoscale fiber network.

In a various embodiments, the liquid medium includes one or more surfactants (e.g. dispersants, anti-flocculants) to maintain the suspension and/or other chemical agents to facilitate network formation or dewatering. For example, BYK-9076 (from BYK Chem USA), Triton X-100, dodecylbenzenesulfonic acid sodium salt (NaDDBS), and SDS may be used. Sometimes, however, a surfactant is not needed, i.e., if the nanoscale fiber can form a stable suspension without it.

Before the filtration step, the nanoscale fibers should be well dispersed in the liquid medium. To facilitate dispersion and minimize agglomeration, the nanoscale fibers concentration in the liquid medium preferably is less than 500 mg/L. In one embodiment, the nanotube concentration is between about 25 and about 150 mg/L, and more preferably between about 40 and 100 mg/L.

Generally, the nanoscale fibers are added to a quantity of the liquid medium under mixing conditions using one or more agitation means known in the art. In one embodiment, the mixture is subjected to sonication using conventional sonication equipment. The nanoscale fibers suspension can be made in a batch process or in a continuous process.

2. Filtration and Network Formation

The second step in making the network of nanoscale fibers involves filtering the suspension through a filter membrane, such that the nanoscale fibers are deposited directly on the filter membrane as the fluid medium flows through the filter membrane, to form the continuous membrane of the nanoscale fibers. The filtration step may be conducted with the aid of vacuum to pull the liquid medium through the filter membrane. Alternatively or in addition, the filtration step may utilize gravity and applied pressure to push the liquid medium through the filter membrane. The amount of vacuum and pressure needed depends on factors such as the porosity of the filter membrane, the viscosity of the liquid medium, speed of movement of the filter membrane, and nanoscale fiber concentration in the suspension. All of these parameters can be manipulated to achieve the desired characteristics of the nanoscale fiber network, including the thickness and porosity of the continuous network.

In one embodiment, the filter membrane is formed of or coated with a polytetrafluoroethylene (e.g., TEFLON™, E.I. Du Pont de Nemours & Co.). In one embodiment, the filter membrane has pores between about 0.1 μm and about 5 μm in diameter. In one example, the pore size is from 0.1 to 2 μm. In another example, the pore size is 0.45 μm. Other materials of construction and pore sizes, such as Nylon or paper materials, can be readily selected as needed for particular process design or product design needs.

Embedded in Matrix of Another Material

Figure 7:
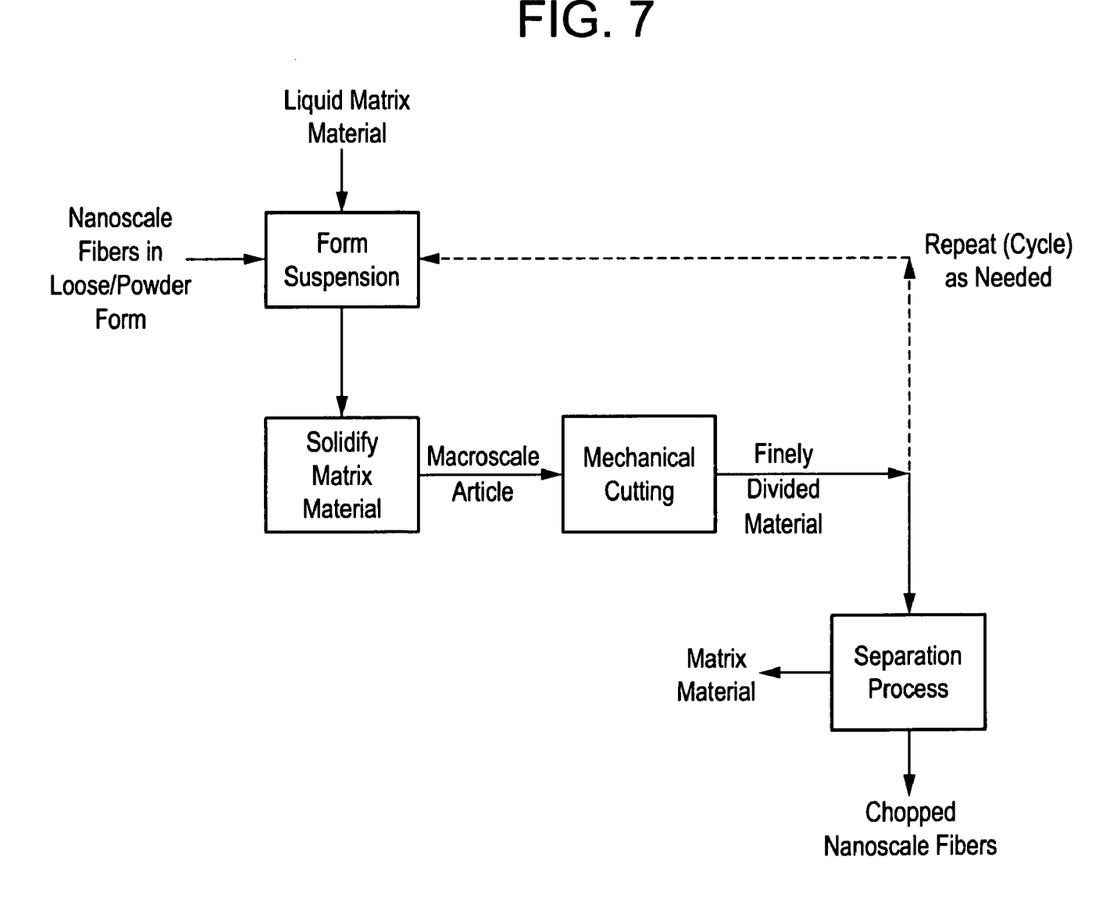
FIG. 7 is a process flow diagram illustrating one embodiment of a process for mechanically chopping carbon nanotubes dispersed in a solid matrix material.

In another embodiment, the macroscale article further comprises a solid matrix material in which the nanoscale fibers are contained or embedded. One embodiment of this process is illustrated in FIG. 7. For example, the nanoscale fibers can be dispersed in a matrix material. In one particular embodiment, the step of forming a macroscale article comprises making a suspension of nanoscale fibers dispersed in a macroquantity of a liquid medium and then freezing the liquid medium, whereby the macroscale article is formed. The article is then subjected to mechanical cutting as described herein. In one embodiment, after the frozen macroscale article is cut in the mechanical cutting step, then the finely divided form (comprising the nanoscale fibers and the frozen matrix material) is heated to melt the matrix material, thereby permitting one to separate the chopped nanoscale fibers from the matrix material. In another embodiment, the matrix material can be separated from the chopped nanoscale fibers using a solvent to dissolve the matrix material but which is a nonsolvent for the nanoscale fibers.

In one embodiment, the nanoscale fibers are aligned during formation of the macroscale article. For example, the filtering step can be conducted within a magnetic field effective to align the nanoscale fibers. (Without the magnetic field, the macroscale article would comprise randomly oriented nanoscale fibers, rather than aligned nanoscale fibers.) For example, the visible alignment of SWNTs and nanofibers can be achieved using a magnet with a field strength greater than 1 Tesla. In one embodiment, the method includes the use of a magnetic field effective to align the nanoscale fibers in a liquid medium of a suspension of nanoscale fibers during formation of the continuous network on a filter membrane in a filtration operating unit. Once the fluid medium is removed and the network (e.g., the buckypaper) is formed, then the magnetic field can be removed (or the network removed from the magnetic field) and the aligned nanoscale fibers will maintain their alignment in the network, which is the macroscale article of that embodiment. In another embodiment, the method includes the use of a magnetic field effective to align the nanoscale fibers in a liquid matrix material, which can then be solidified. This solidification step can be conducted by any of a number of different transformation processes. Examples include cooling to freeze the matrix material, by creating an appropriate chemical reaction of the matrix material (e.g., cross-linking) or by removing a solvent to precipitate the matrix material. Once the liquid matrix material is solidified, then the magnetic field can be removed and the aligned nanoscale fibers will maintain their alignment in the matrix material, which is the macroscale article of that embodiment.

Cutting the Macroscale Article

After the macroscale article is formed, it is directly cut using macroscale, or bulk, cutting or precise sectioning equipment known in the art, to transform the article into a finely divided form (e.g., a powder) that includes chopped nanoscale fibers. See FIG. 2. In one embodiment, the cutting is done using one or more conventional blades (e.g., diamond, ceramic, or metal) mechanically driven through a portion of the macroscale article. In one embodiment, a microtome is used to cut the macroscale article.

In preferred embodiments, the forming and cutting processes are repeated two or more times to increase the degree of chopping (i.e., decrease the mean length or aspect ratio of the nanoscale fibers). Therefore, in one embodiment, the finely divided form of nanoscale fibers that was produced from the first cutting is formed into a second macroscale article, and then the second macroscale article is mechanically cut into a second finely divided form comprising nanoscale fibers that have been twice chopped. The twice chopped nanoscale fibers can be formed into a third macroscale article, which can then be mechanically cut into a third finely divided form, comprising nanoscale fibers that have been thrice chopped. This can be repeated as needed to control the length and aspect ratio of the nanoscale fibers.

In one embodiment, the method comprises forming SWNTs or tube ropes into thin films of tube network and then directly cutting these films. In this method, the SWNTs are first fabricated into a thin film (e.g., buckypapers) using a multiple step dispersion and filtration method. By cutting the film into a fine powder using a sharp blade or other proper tools, the SWNTs can be effectively cut. By repeating the process of producing a thin film and cutting several times, chopped nanotube with controlled length and open ends can be obtained. After chopping the buckypapers to obtain shorter SWNTs with open ends, the SWNTs can be again dispersed in an aqueous suspension to make new buckypapers, which are then subjected to further cutting. This cycle can be repeated as needed, and the tube aspect ratios can be controlled by varying the cutting cycles and times. In a typical process, the cycle is repeated between five and ten times.

Figure 8:
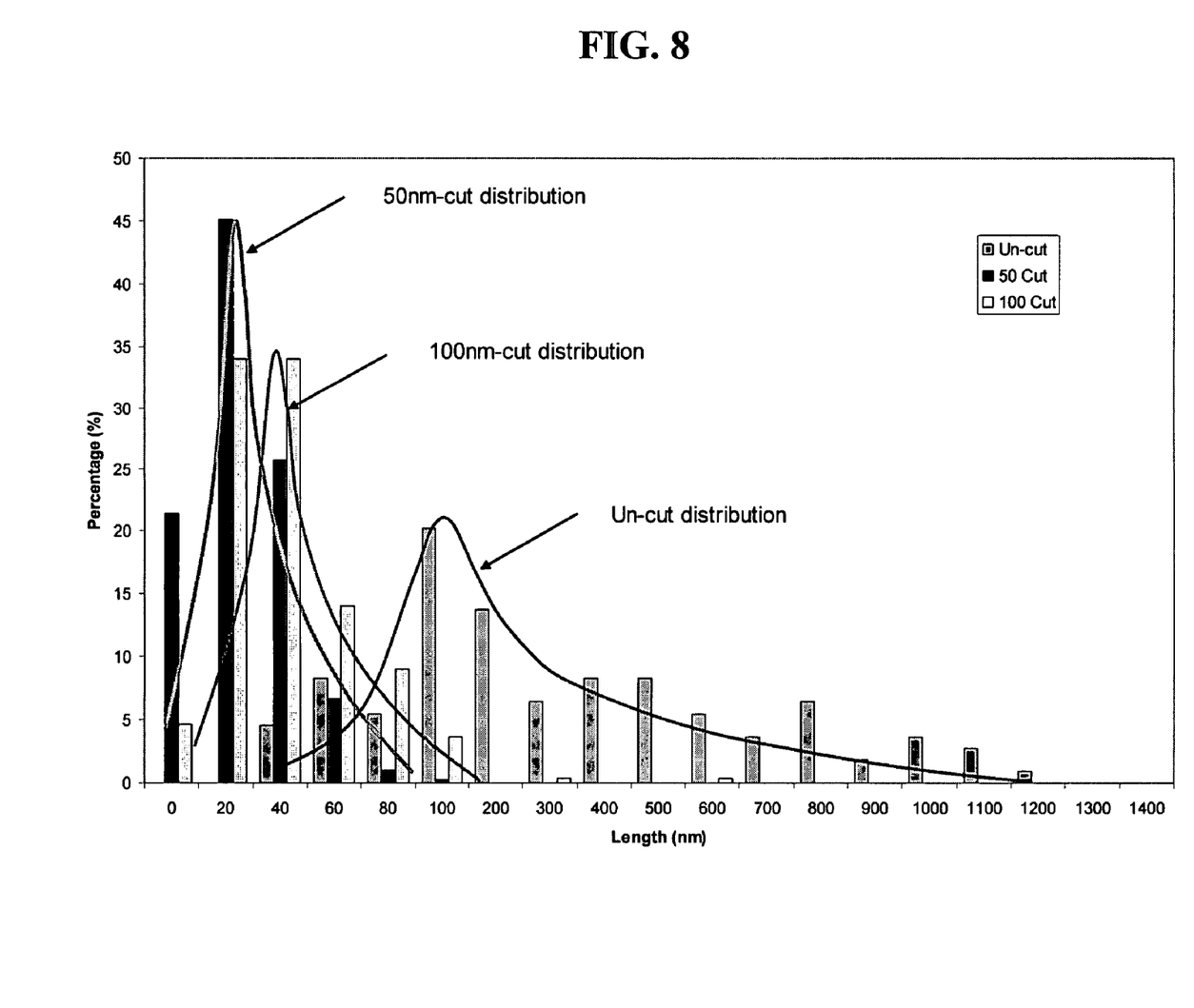
FIG. 8 is a graph of showing nanotube length distribution changes that occur with mechanical cutting using methods described herein.

In another embodiment, the method comprises using a low temperature microtome machine to effectively chop the nanotubes. In this method, a suspension of nanotubes or buckypaper is first prepared and then the suspension is frozen by cooling to produce a solid material. Then, a low-temperature microtome machine is used to chop the frozen tube suspension (i.e., the macroscale article) into micron or sub-micron layers. As a result, the nanotubes are chopped at a controlled length with open ends. For example, FIG. 8 shows the results of cutting magnetically aligned SWNT buckypapers. Once chopped, the material can be thawed in order to use the chopped nanotubes.

Functionalization of Chopped Nanotubes

In another aspect, the active carbon atoms at the open ends of the chopped nanotubes are functionalized. In one embodiment, hydroxyl, carbonyl and/or carboxyl groups are generated at the open ends by adding the chopped SWNTs to a mixed acid solution and agitated for a period. For example, the SWNTs could be added to a mixture of sulfuric acid and nitric acid ($H_2SO_4$:$HNO_3$=1:3) which is stirred for 150 minutes and then treated with a bath sonication for 10 minutes, to enhance nanotube dispersion and interfacial bonding in nanocomposites or other nanostructures.

Use of the Chopped Nanoscale Fibers

The chopped nanoscale fibers produced by the methods described herein can be used in various applications. Nanotube materials chopped by the methods described herein can be widely used for development of nanotubes, nanofibers and other nanoscale fibrous-based materials and functional devices. Examples of applications include nanotube and nanofiber-reinforced composites, electrical conducting plastic and rubber materials, nanotube containers for drug delivery, and tips of atomic force microscopes. More particular examples include lightweight, exceptionally strong materials for aerospace structural and functional composites, lightning strike protection, EMI shielding, and directional thermal and electrical conducting applications in materials and devices.

The chopped tubes demonstrate good dispersion and interfacial bonding in SWNT/epoxy nanocomposites, which are critical properties in the development of both high performance structural and multifunctional composites using nanotubes. In a preferred embodiment, the chopped nanotubes are dispersed in a fluid polymeric precursor material, which is then polymerized into a solid matrix material, forming a reinforced composite material, such as an epoxy composite. In one embodiment, the method includes the steps of impregnating pores of a network or membrane of nanoscale fibers with a liquid matrix material; and then solidifying the liquid matrix material. The impregnation step can be accomplished by essentially any means which permits or forces the liquid matrix material to infiltrate the pores (e.g., spaces between nanotubes) in the membrane of nanotubes or other nanoscale fibers. The infiltration can be done with the aid of gravity, vacuum pressure, direct pressure means (e.g., hot press techniques), or a combination thereof. In addition or alternatively, the impregnation process may be facilitated by the use of diluted, low viscosity solutions of the matrix material, to assist the material's penetration into the nanoscale porous structure of the buckypaper. The infiltration can be done in a continuous or batch process.

The step of solidifying the matrix material can be based on a chemical reaction, temperature, pressure or a combination thereof. In one embodiment, the fluid matrix material comprises a crosslinkable matrix material and the solidifying step comprises a reaction which crosslinks the matrix material. For example, the fluid matrix material could comprise a matrix material at a temperature below the temperature effective to initiate cross-linking of the matrix material, and then the fluid matrix material could be heated to a temperature and for a time effective to cause the matrix material to self-crosslink. These methods could be used with thermoset polymers and polymer precursors, such as epoxies.

In one embodiment, a nanoporous sheet of SWNT buckypapers is impregnated with an epoxy or other resin liquid material. The liquid material is then hardened to form the nanotube-reinforced structural material. Such composite materials have a wide range of applications, for example, where strength (e.g., as measured by storage modulus) is important.

A wide variety of materials can be used as the matrix material. Selection of the appropriate material depends on the end use of the composite as well as the particular techniques employed to fluidize and solidify the matrix material. Examples of suitable matrix materials include polymers, ceramics, glasses, metals, alloys, and other composites. In one embodiment, the matrix material is polymeric. That is, it comprises one or more oligomers, polymers, copolymers, or blends thereof. In one embodiment, the matrix material comprises a thermoplastic polymer. In another embodiment, the matrix material comprises a thermoset polymer, such as phenol formaldehyde resins and urea formaldehyde resins. Examples of polymers suitable for use in the process include polyolefins, polyesters, nonpeptide polyamines, polyamides, polycarbonates, polyalkenes, polyvinyl ethers, polyglycolides, cellulose ethers, polyvinyl halides, polyhydroxyalkanoates, polyanhydrides, polystyrenes, polyacrylates, polymethacrylates, polyurethanes, and copolymers and blends thereof. In one embodiment, the fluid matrix material comprises a polymer precursor or a crosslinkable material. As used herein, the term "polymer precursor" refers to monomers and macromers capable of being polymerized. As used herein, the term "crosslinkable material" refers to materials that can crosslink with themselves or with another material, upon heating or addition of a catalysts or other appropriate initiator. In one preferred embodiment, the polymer precursor comprises an epoxy resin. In another embodiment, the polymer precursor comprises a cyanoacrylate.

The matrix material may further include one or more processing additives. Examples include viscosity modifiers, fillers, binders, surfactants, and wetting agents, as known in the art.

The methods and compositions can be further understood with the following non-limiting examples.

EXAMPLE 1

Mechanical Chopping of Nanotubes

BuckyPearls™ (Carbon Nanotechnologies Inc.), a highly purified SWNT, were suspended in water with surfactant at a surfactant to SWNT weight ratio of 10:1. Sonication was used to make a uniform suspension, which was then subjected to a filtration process to make buckypapers. The circular buckypapers were roughly 10 to 40 μm thick with diameters of 90 mm, 47, mm, or 25 mm, and composed of uniformly dispersed nanotubes (usually in rope form). The several layers of the buckypapers were stacked together and then manually chopped to fine powders (less than 0.5 mm size) by using a conventional sharp single edge blade, and the resultant powders were used to again make an aqueous dispersion from which buckypapers again were made. This process of chopping and reforming buckypapers was repeated for eight cycles.

The diameter and length of the pristine and chopped nanotubes were analyzed. SEM and AFM results showed that the mechanical cutting effectively chopped the original SWNTs into shorter tubes. Analysis showed that the average lengths of SWNT ropes were 0.491 μm before cutting and 0.261 μm after five cutting cycles. See FIGS. 3-6. The AFM results show that the average aspect ratios of the pristine and cut SWNTs were 53 and 36, respectively.

EXAMPLE 2

Microtome Chopping of Aligned Nanotube Buckypapers

More precise cutting of nanotubes was also conducted by using a Leica Ultramicrotome UC6/FC6 machine and magnetically aligned SWNT buckypapers frozen in water. The aligned buckypaper was fabricated using a 17.3 Tesla magnet. Ten to thirty small strips (5 mm in width and 30 mm in length) of the aligned buckypaper were wetted with water and then tightly stacked together in an identical SWNT alignment direction, and then frozen to prepare a solid cutting sample for the microtome. The microtome was then used to chop (50 nm and 100 nm) the frozen aligned buckypaper laminate using a sharp diamond knife at a temperature between about –20 and –40° C. The cutting direction was perpendicular to the SWNT alignment direction in the sample to achieve more precise length control, compared to using randomly oriented SWNT buckypapers. FIG. 8 shows that the length distribution changes before and after cutting, clearly indicating this method can effectively manipulate SWNT length.

EXAMPLE 3

Functionalization of Mechanically Chopped Nanotubes

The chopped nanotubes from Example 1 were subjected to gentle oxidation following five cutting cycles, by adding the chopped SWNTs in mixed acid solution ($H_2SO_4$:$HNO_3$=1:3) and stirred for 150 minutes placed in a bath sonication for 10 minutes. AFM images showed that the most oxidized tubes attracted dispersion surfactant at their ends and formed a "dog-bone" shape that was not observed before the oxidation. This indicates the forming of oxygen-containing functional groups at the ends of the chopped nanotubes.

EXAMPLE 4

Comparison of Interfacial Bonding of Mechanically Chopped And Pristine SWNTs in a Resin Matrix Nanocomposites of both chopped and pristine SWNTs composites were fabricated. SWNTs reinforced epoxy composites were made using 1 wt % SWNTs in Epon862 (epoxy)/EPI Cure W (hardener) (Shell Co.) by dispersing either chopped or pristine SWNTs into the resin system and sonicating for two hours. The mixture was then cast in a mold and cured at 177° C. for 2.5 hours, cooled to room temperature, post cured for another two hours at 177° C., and then cooled to room temperature.

Dynamic mechanical analysis (using DMA2980, TA Instrument Co.) showed that the storage modulus of the pristine SWNT-reinforced composites increased by 11.2 wt % compared to that of the neat resin, and that the chopped SWNT-reinforced composites showed better reinforcement efficiency and the storage modulus increased by 17.2 wt %. It was also observed that the glass transition temperature (Tg) of the chopped nanotubes was significantly lower than that of the pristine nanotubes. The modulus increase and Tg decrease in the chopped SWNT composites may be due to the increased interfacial bonding and better load transfer caused by the possible "mechanical lock" created by filling the resin matrix molecules into the open ends of the chopped nanotubes, which would strengthen the molecular interactions between the resin matrix and the chopped nanotubes.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

We claim:

1. A method for mechanically chopping nanotubes comprising:
   forming a macroscale article which comprises nanotubes and a solid medium;
   cutting the macroscale article with a blade into a finely divided form comprising nanotubes that have been chopped to have a controlled mean length and at least one open end;
   dissolving or melting the solid medium of the finely divided form; and
   separating the chopped nanotubes from the dissolved or melted medium.

2. The method of claim 1, wherein the nanotubes comprise carbon nanotubes.

3. The method of claim 1, wherein the macroscale article comprises one or more buckypapers.

4. The method of claim 1, wherein the nanotubes are carbon nanotubes and the macroscale article is formed with the carbon nanotubes aligned.

5. The method of claim 4, wherein the cutting is in a direction substantially perpendicular to the direction of alignment of the nanotubes.

6. The method of claim 1, wherein the macroscale article is formed by a process which comprises:
  making a suspension of nanotubes dispersed in a liquid medium;
  filtering the suspension through a filter membrane such that the nanotubes are deposited directly on the filter membrane as the liquid medium flows through the filter membrane to form a continuous network of the nanotubes;
  combining the continuous network of nanotubes with a second liquid medium; and
  solidifying the second liquid medium.

7. The method of claim 6, wherein the suspension comprises SWNTs dispersed in solvent selected from the group consisting of water, volatile organic liquids, and combinations thereof.

8. The method of claim 6, wherein the suspension further comprises one or more surfactants.

9. The method of claim 1, further comprising:
  forming the chopped nanotubes into a second macroscale article comprising a second solid medium; and
  cutting the second macroscale article with a blade into a second finely divided form comprising nanotubes that have been twice chopped to have a second controlled mean length.

10. The method of claim 9, further comprising:
  forming the twice chopped nanotubes into a third macroscale article comprising a third solid medium; and
  cutting the third macroscale article with a blade into a third finely divided form comprising nanotubes that have been thrice chopped to have a third controlled mean length.

11. The method of claim 1, wherein the blade comprises a microtome.

12. The method of claim 1, wherein the forming step comprises making a suspension of nanotubes dispersed in a liquid medium and then solidifying the liquid medium, thereby forming the macroscale article.

13. A method of making a nanocomposite material comprising:
  combining the chopped nanotubes made by the method of claim 1 with a liquid matrix material; and then
  solidifying the liquid matrix material.

14. The method of claim 13, wherein the chopped nanotubes are formed into a porous continuous network form and then the liquid matrix material is impregnated into the pores of the porous network.

15. The method of claim 13, wherein the liquid matrix material comprises a polymer precursor or thermoplastic polymer.

16. The method of claim 14, wherein the impregnation step is done with the aid of vacuum, direct pressure, or both.

17. The method of claim 1, wherein the solid medium comprises frozen water.

* * * * *